United States Patent
Krude et al.

[11] Patent Number: 5,494,129
[45] Date of Patent: Feb. 27, 1996

[54] INSERTABLE UNIT FOR A BEARING ASSEMBLY

[75] Inventors: Werner Krude, Neunkirchen; Peter Harz, Hennef, both of Germany

[73] Assignee: GKN Automotive AG, Siegburg, Germany

[21] Appl. No.: 342,233

[22] Filed: Nov. 18, 1994

[30] Foreign Application Priority Data

Nov. 18, 1993 [DE] Germany ............ 43 39 313.6
Oct. 14, 1994 [DE] Germany ............ 44 36 789.9

[51] Int. Cl.$^6$ ............ B60K 17/24; B60K 17/30
[52] U.S. Cl. ............ 180/256; 180/259; 180/344; 180/385
[58] Field of Search ............ 180/259, 258, 180/257, 256, 254, 263, 344, 379, 385

[56] References Cited

U.S. PATENT DOCUMENTS

| | | | |
|---|---|---|---|
| 4,094,376 | 6/1978 | Welschof | 180/254 |
| 4,150,553 | 4/1979 | Aucktor | 180/385 |
| 4,300,651 | 11/1981 | Krude | 180/256 |
| 4,460,058 | 7/1984 | Welschof et al. | 180/258 |
| 4,493,388 | 1/1985 | Welschof et al. | 180/258 |
| 4,536,038 | 8/1985 | Krude | 180/259 |
| 4,537,270 | 8/1985 | Brandenstein et al. | 180/259 |
| 4,629,028 | 12/1986 | Krude et al. | 180/259 |

FOREIGN PATENT DOCUMENTS

| | | | |
|---|---|---|---|
| 0537043A1 | 4/1993 | European Pat. Off. | |
| 2631402 | 11/1989 | France | |
| 2708416 | 8/1978 | Germany | 180/259 |
| 3615858 | 11/1986 | Germany | 180/344 |
| 2007801 | 5/1979 | United Kingdom | |
| 2088526 | 6/1982 | United Kingdom | 180/259 |

*Primary Examiner*—Margaret A. Focarino
*Assistant Examiner*—Peter C. English
*Attorney, Agent, or Firm*—Harness, Dickey & Pierce

[57] ABSTRACT

An insertable unit for a wheel bearing has an integrated constant velocity universal joint, which is axially insertable into the wheel carrier from the outside and which permits easy dismantling and re-assembly. The outer joint part at the wheel end can be inserted through the through-bore of the wheel carrier. The outer bearing ring is inserted into the through-bore and is secured against axial displacement. The inner diameter of the two-part inner bearing ring is smaller than the outer diameter of the outer joint part. The outer joint part and the wheel hub are welded to one another in the region of the axially inner end of the two-part inner bearing ring, with the outer joint part being supported on the inner bearing ring by a planar face.

14 Claims, 4 Drawing Sheets

INSERTABLE UNIT FOR A BEARING ASSEMBLY

FIELD OF THE INVENTION

The present invention relates to an insertable unit for a bearing assembly of a steered driving axle of a motor vehicle. The bearing assembly comprises a double-row deep-groove ball bearing and a constant velocity joint provided at the wheel end. The constant velocity universal joint consists of an outer joint part and an inner joint part. The double-row deep-groove ball bearing consists of a two-part inner bearing ring associated with the wheel hub and a one-piece outer bearing ring held in a through-bore of the wheel carrier.

BACKGROUND OF THE INVENTION

It is known in the prior art to dimension the outer diameter of the outer joint part of a constant velocity universal joint associated with the wheel in such a way that the outer joint part of the constant velocity universal joint at the wheel end may be inserted into a through-bore of the wheel (U.S. Pat. No. 4,300,651).

The disadvantage of the described solution is that the outer joint part of the constant velocity universal joint at the wheel end is positioned inside the wheel hub, with the double-row annular ball bearing embracing the wheel hub. This means that the diameter of the bearing has to be unusually large in order to be positioned over the outside diameter of the constant velocity universal joint. Such a bearing relatively expensive.

It is also disadvantageous that the outer circumference of the outer joint part of the constant velocity joint at the wheel end has to be provided with teeth or splines which correspond to teeth or splines provided at the inner bore of the wheel hub. As a result, the production costs of wheel hub and outer joint part are disproportionately high.

According to GB 2007801 A it is known to connect an outer joint part welded to the wheel hub to the wheel carrier by means of a flange-shaped outer bearing ring. Such a solution is labor-intensive. Furthermore, each flange connection constitutes a weak region in regards to deformation.

It is the object of the present invention to provide an insertable unit for a bearing assembly which, from the outside, can easily be axially inserted into the wheel carrier, which can be secured against axial displacement, which is easily fitted and removed and can be produced at a reasonable cost.

SUMMARY OF THE INVENTION

In accordance with one embodiment of the invention, the objective is achieved in that the diameter of the through-bore of the wheel carrier, the outer diameter of the outer bearing ring and the outer diameter of the outer joint part comprise the same general dimensions. The outer diameter of the outer joint part comprises a clearance fit relative to the through-bore and that the outer diameter of the outer bearing ring comprises a press-fit relative to the through-bore.

In accordance with another embodiment of the present invention, the objective is achieved in that the outer joint part of the constant velocity joint at the wheel end may be inserted through the through-bore of the wheel carrier. The outer bearing ring of the wheel bearing is inserted into the through-bore of the wheel carrier and is secured against axial displacement. The inner diameter of the two-part inner bearing ring of the wheel bearing is smaller than the outer diameter of the outer joint part of the constant velocity joint. The outer joint part and the wheel hub are welded to one another in the region of the axially inner end of the two-part inner bearing ring, with the outer joint part being supported on the inner bearing ring by means of a planar face.

The advantage of the insertable unit for a bearing assembly in accordance with the present invention is that the outer joint part of the constant velocity universal joint at the wheel end may be slid through the through-bore of the wheel carrier with play and the outer bearing ring of the wheel bearing may be inserted into the through-bore of the wheel carrier where it is held by axial securing means or by a self-retaining press-fit.

In the first embodiment, the outer bearing ring of the wheel bearing is pressed into the through-bore of the wheel carrier and axially secured there by a press-fit.

The press-fit allows a predetermined holding force to be defined for the outer bearing ring. The holding force must be greater than the maximum transverse forces occurring at the wheel.

In an advantageous embodiment of the invention, it is proposed that, with an H7 fit for the through-bore, the outer diameter of the outer joint part comprises at most a fit range group (g) and that the fit range group of the outer bearing ring is calculated to amount to at least (r). This solution allows the outer joint part, the outer bearing part and the outer bearing ring to be produced cost-effectively because it is possible to use conventional fit values.

According to another embodiment of the present invention, the maximum outer diameter of the outer joint part associated with the constant velocity universal joint at the gearbox end has the same fit range with the through-bore as the outer diameter of the outer joint part at the wheel end.

In the case of this embodiment, it is possible for a complete driveshaft with one constant velocity universal joint at the wheel end and one constant velocity universal joint at the gearbox end to be slid through the through-bore of the wheel carrier and to be axially secured therein.

This solution is particularly advantageous in the case of any repairs or if the entire driveshaft has to be replaced.

According to a further advantageous feature of the present invention, is proposed that a retaining ring is disposed in an area located between the outer bearing ring and by a recess located on the axially outwardly pointing end of the outer joint part of the constant velocity universal joint at the wheel end. The retaining ring engages a groove arranged in the through-bore of the wheel carrier with the groove comprising a running-out portion tapered axially outwardly.

This embodiment is advantageous in that the outer bearing ring is axially secured in the through-bore by a generally form-fitting connection which, however, may be overcome by a predetermined axially outwardly directed extraction force due to the running-out portion of the groove tapered axially outward.

In this case, too, there are no problems involved in removing the entire driveshaft or the insertable unit.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DESCRIPTION OF THE PREFERRED EMBODIMENT

Figure 1:
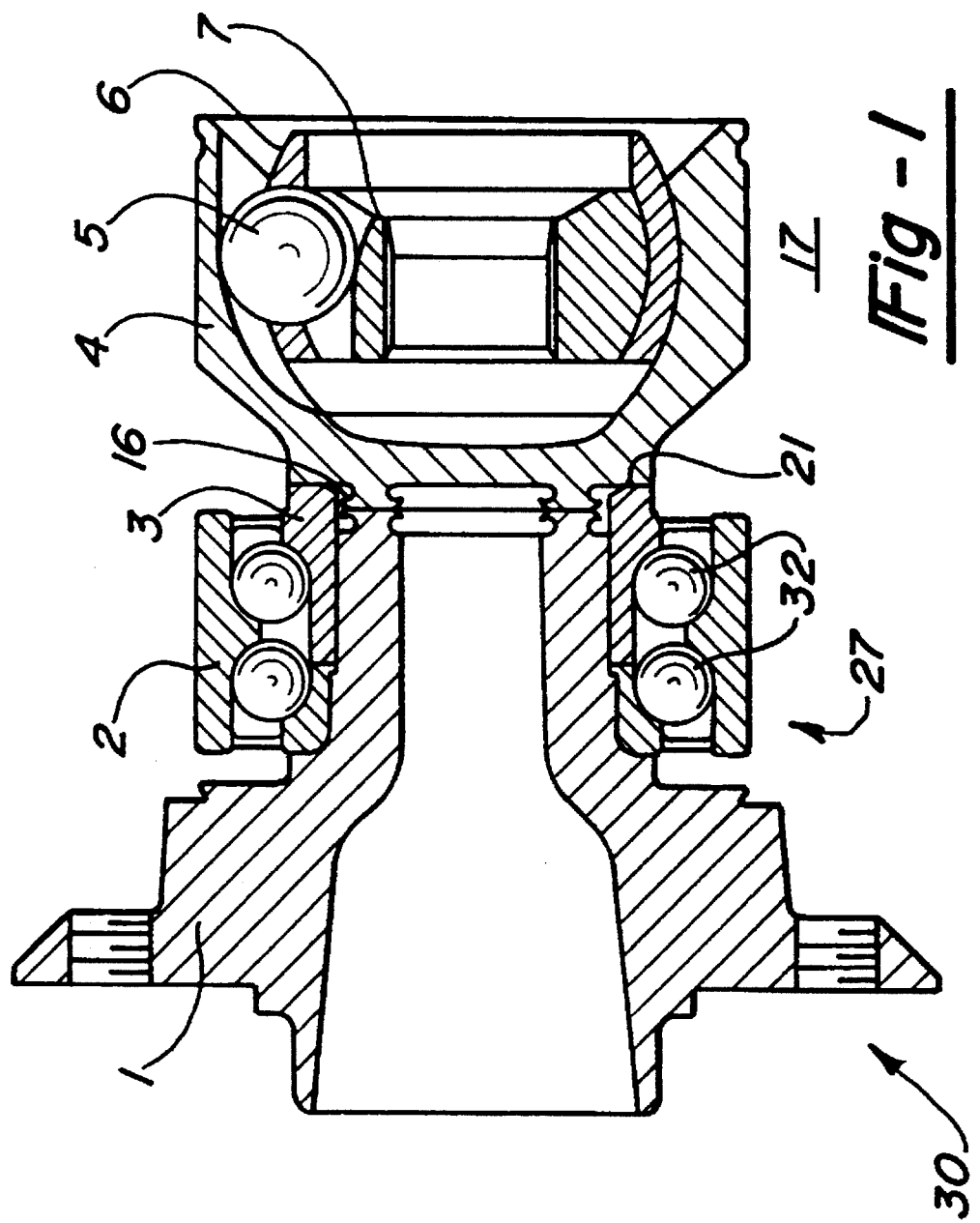
FIG. 1 shows an insertable unit in accordance with the present invention, consisting of the wheel hub, the wheel bearing and an associated constant velocity universal joint.

Referring now to the drawings in which like reference numerals designate like or corresponding parts throughout the several views, there is shown in FIG. 1 an insertable unit 30 which consists of a wheel hub 1, a double-row deep-groove ball bearing 27 and a constant velocity universal joint 17 at the wheel end. The two-part deep-groove ball bearing 27 is comprised of a one-piece outer bearing ring 2 and a two-part inner bearing ring 3 and balls 32.

The wheel hub 1 is connected to an outer joint part 4 of the constant velocity universal joint 17 at the wheel end by welding, preferably friction welding, the weld 16 being arranged near the axially inwardly directed end of the two-part inner bearing ring 3. The outer joint part 4, by means of its planar face 21, contacts the two-part inner bearing ring 3.

This design measure ensures that while the weld 16 is cooling down, the two-part inner bearing ring 3 is pretensioned via the planar face 21.

The constant velocity universal joint 17 as a whole consists of the outer joint part 4, an inner joint part 7, a cage 6 and torque transmitting balls 5.

Figure 2:
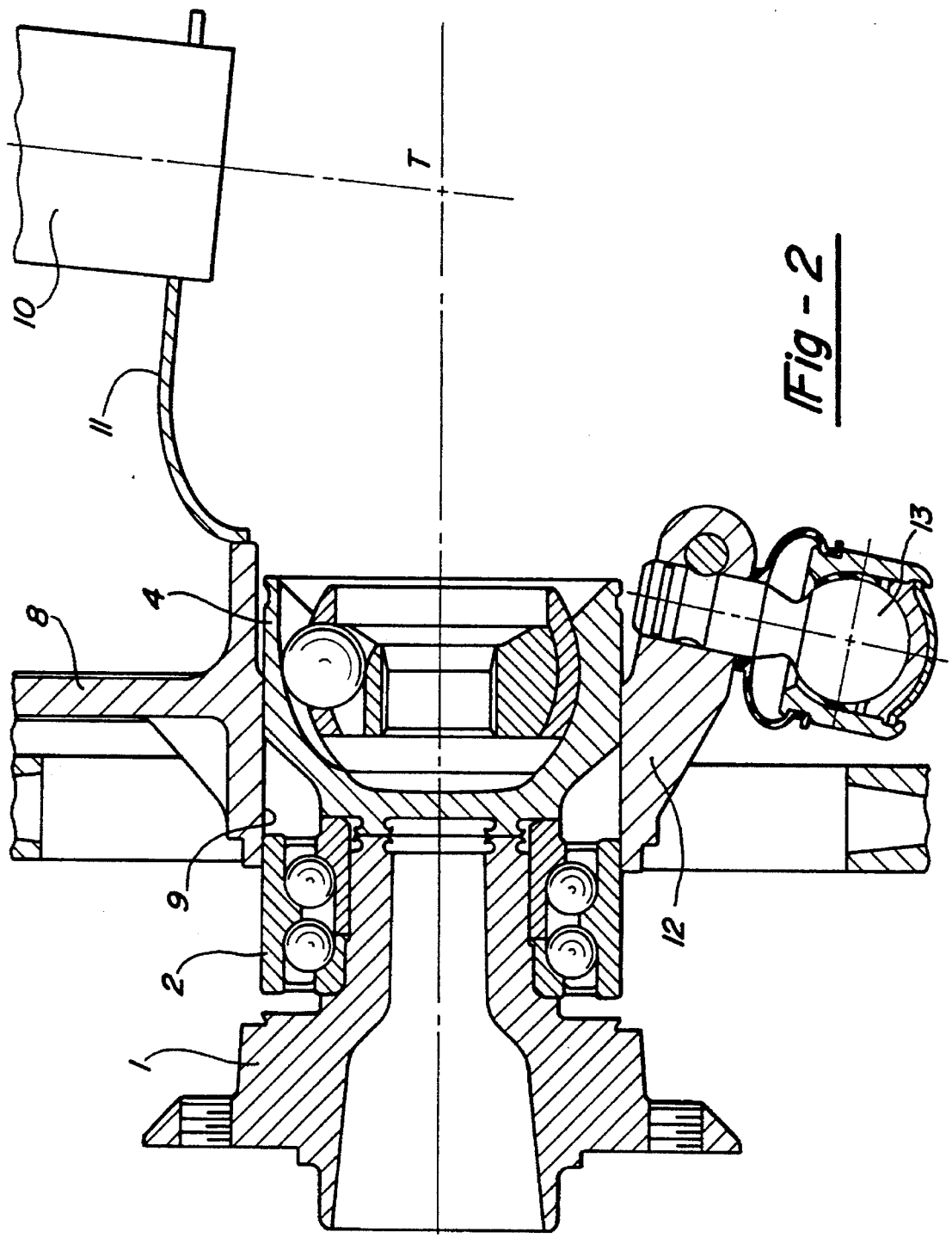
FIG. 2 shows an insertable unit according to FIG. 1 in the inserted position.

FIG. 2 shows the insertable unit 30 in the inserted condition. The outer joint part 4 has been slid with play through the through-bore 9 of the wheel carrier 8. In the case of the embodiment according to FIG. 2, the outer bearing ring 2 may be pressed into the through-bore 9 with a press-fit. To prevent the bearing from being subjected to excessive pressure while being pressed in, the insertion pressure should be applied to the outer bearing ring 2 as well.

FIG. 2 shows the spring strut 10 which, by a suspension means 11, is connected to the wheel carrier 8.

FIG. 2 also shows that at the lower end of the wheel carrier 8 there are arranged articulation means 12 with a ball joint 13 to provide a connection with a stabilizer (not illustrated) for example.

Figure 3:
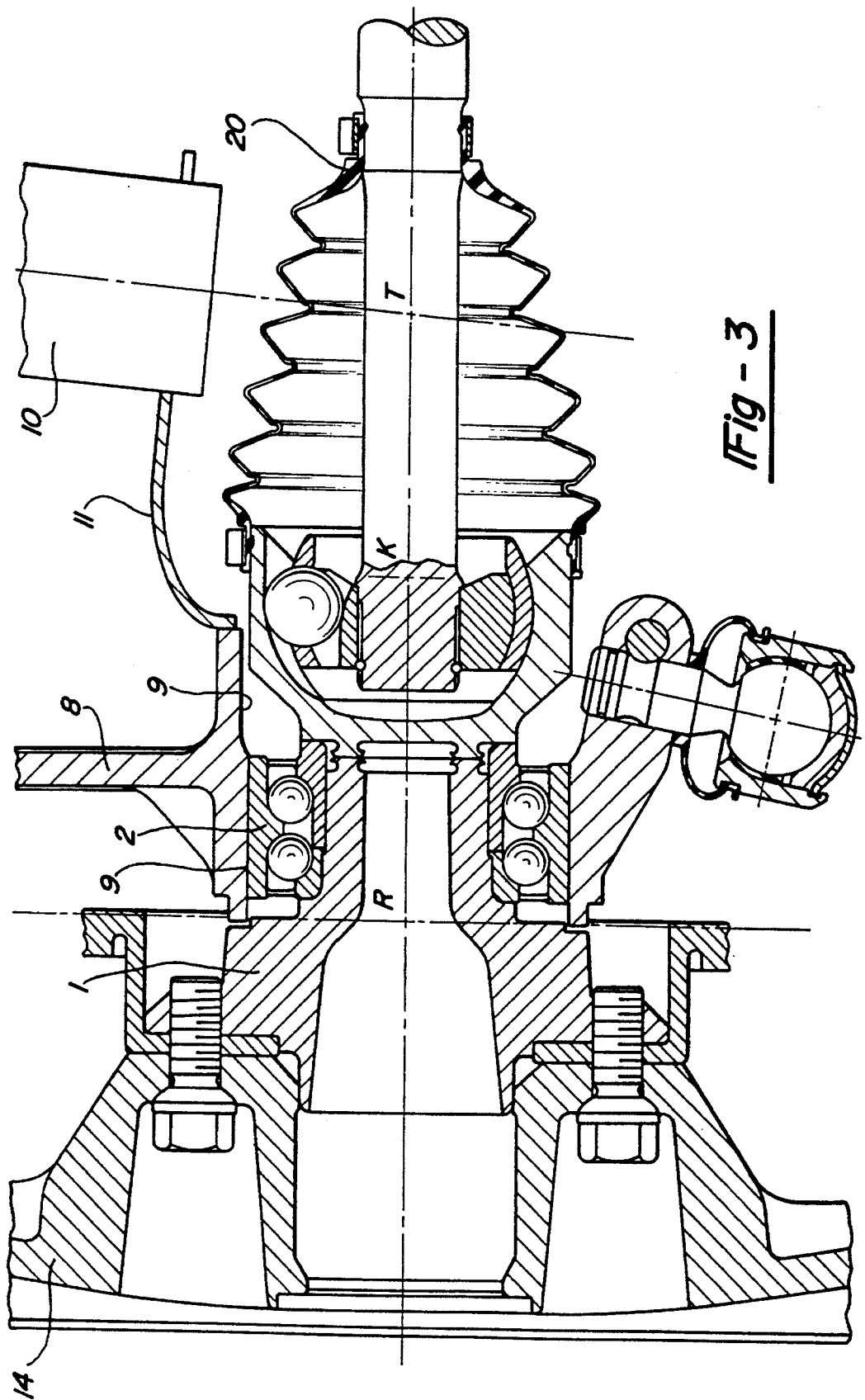
FIG. 3 shows the insertable unit according to FIG. 1 in the fitted condition.

FIG. 3 shows the insertable unit 30 according to FIG. 2 in the fully fitted condition. A convoluted boot 20 protecting the constant velocity universal joint 17 from dirt and at the same time sealing the joint to prevent any loss of grease is fitted on the outer joint part 4. With this embodiment, the convoluted boot 20 has to be fitted after the insertable unit has been fitted in the wheel carrier because the boot 20 is positioned on the outside diameter of the outer joint part 4.

Furthermore, FIG. 3 shows a wheel rim 14 which is secured to wheel hub 1. The outer bearing ring 2 is held by a press-fit in the through-bore 9 of the wheel carrier and, if necessary, may be removed by a predetermined extraction force or pressure.

Figure 4:
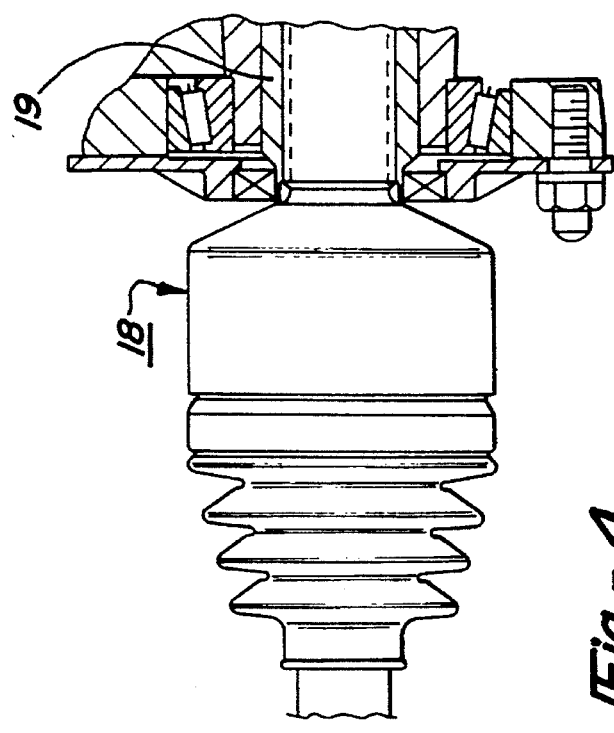
FIG. 4 shows an insertable unit with an integrated driveshaft.
Figure 5:
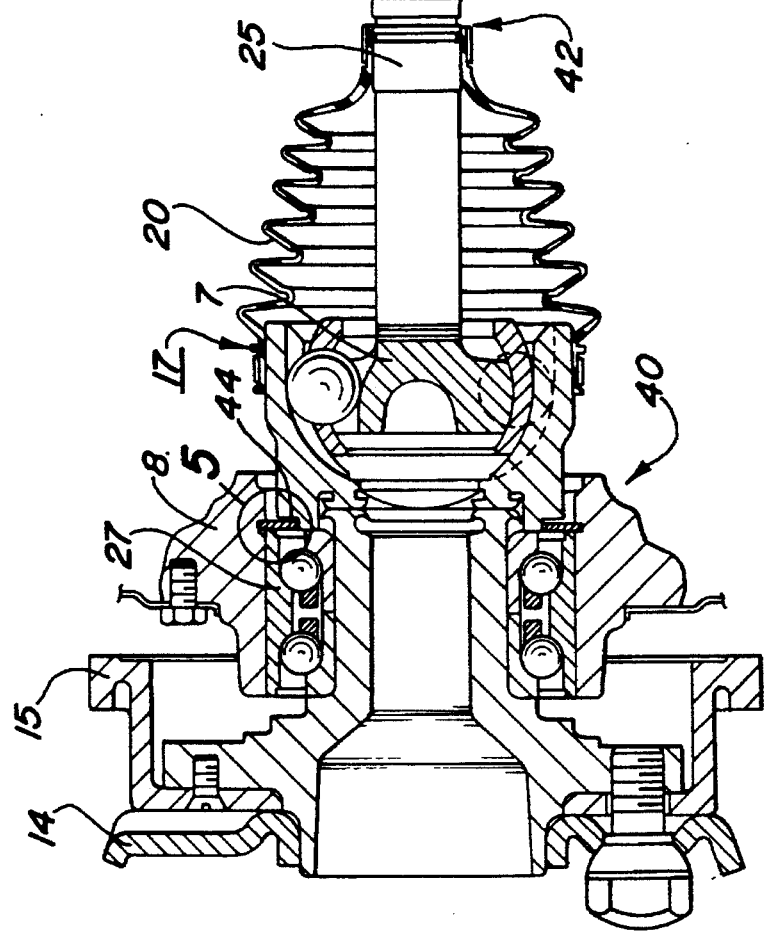
FIG. 5 is an enlarged view of the retaining ring shown in Circle 5 of FIG. 4.

FIG. 4 shows another embodiment of insertable unit 40 as fitted, including a completely integrated driveshaft 42. The driveshaft 42 comprises a constant velocity universal joint 17 at the wheel end and a constant velocity universal joint 18 at the gearbox end. The constant velocity universal joints 17 and 18 are connected to one another by sideshaft 25.

The constant velocity universal joint 18 at the gearbox end is non-rotatably connected to the gearbox output 19.

In addition to the wheel rim 14, FIG. 4 partially shows a brake disc 15.

In FIG. 4, the outer bearing ring 2 is axially secured by a retaining ring 22. The retaining ring 22 is received in a slot 23 formed by the outer bearing ring 2 and a recess 44 arranged at the axially outwardly pointing end of the outer joint part 4 of the constant velocity universal joint 17 at the wheel end. The retaining ring, in the fitted condition, engages a groove 24 arranged in the through-bore 9 of the wheel carrier 8. The groove 24 comprises an axially outwardly tapered running-out region 26. This means that, with this embodiment, the outer bearing ring 2 may be extracted or pressed out of the through-bore 9 with a predetermined force, and after having removed the convoluted boots 20 from the constant velocity joints 17 and 18, the entire driveshaft may be removed from the wheel carrier 8.

While the above detailed description describes the preferred embodiment of the present invention, it should be understood that the present invention is susceptible to modification, variation and alteration without deviating from the scope and fair meaning of the subjoined claims.

What is claimed is:

1. An insertable unit for a bearing assembly of a driving axle, said driving axle including a wheel carrier defining a through-bore, said insertable unit comprising:

a wheel hub;

a double-row bearing mounted on said wheel hub, said double-row bearing having an inner bearing ring defining an inner diameter and an outer bearing ring defining an outer diameter, said outer bearing ring for securing within said through-bore of said wheel carrier; and an outer constant velocity universal joint having an outer joint part defining an outer diameter and an inner joint part, said outer diameter of said outer joint part being larger than said inner diameter of said inner bearing ring, and said outer diameter of said outer joint part being substantially similar in size to the outer diameter of said outer bearing ring and a diameter of said through-bore such that said through-bore diameter enables insertion of said outer constant velocity universal joint, via a clearance fit, through said through-bore and said outer bearing ring is press fit relative to said through-bore, said outer joint part of said outer joint being welded to said wheel hub adjacent one end of said inner bearing ring and supported on said inner bearing ring by a planar face.

2. The insertable unit according to claim 1 wherein, said inner bearing ring is two piece.

3. The insertable unit according to claim 1 wherein, said outer bearing ring is press-fit into said through-bore.

4. The insertable unit according to claim 1 wherein, said outer diameter of said outer joint part of said outer joint is smaller than said outer diameter of said outer bearing ring.

5. The insertable unit according to claim 1 wherein, said insertable unit further comprises:

an inner constant velocity universal joint having an outer joint part defining an outer diameter and an inner joint part; and a side shaft disposed between said inner joint part of said inner joint and said inner joint part of said outer joint, said through-bore of said wheel carrier having a diameter large enough for permitting insertion of said inner constant velocity joint through said through-bore.

6. The insertable unit according to claim 1 wherein, said through-bore of said carrier defines a groove, said insertable unit further comprising a retaining ring disposed within said groove.

7. The insertable unit according to claim 6 wherein, said groove includes a tapered running-out portion.

8. The insertable unit according to claim 7 wherein, said retaining ring is disposed between said outer bearing ring of said bearing and said outer joint part of said outer joint.

9. An insertable unit for a bearing assembly of a driving axle, said driving axle including a wheel carrier defining a through-bore, said insertable unit comprising:

a wheel hub;

10. The insertable unit according to claim 9 wherein, said through-bore has an H7 fit, said outer diameter of said outer joint part comprises a fit range of group (g) and said outer diameter of said outer bearing ring comprises a fit range of group (r).

11. The insertable unit according to claim 9 wherein, said insertable unit further comprises:

an inner constant velocity universal joint having an outer joint part defining an outer diameter and an inner joint part; and a side shaft disposed between said inner joint part of said inner joint and said inner joint part of said outer joint part, said outer diameter of said outer joint part of said inner joint comprising a clearance fit relative to said through-bore.

12. The insertable unit according to claim 9 wherein, said through-bore of said carrier defines a groove, said insertable unit further comprising a retaining ring disposed within said groove.

13. The insertable unit according to claim 12 wherein, said groove includes a tapered running-out portion.

14. The insertable unit according to claim 13 wherein, said retaining ring is disposed between said outer bearing ring of said bearing and said outer joint part of said outer joint.

a double-row bearing mounted on said wheel hub, said double-row bearing having an inner bearing ring defining an inner diameter and an outer bearing ring defining an outer diameter, said outer bearing ring being disposed within said through-bore of said wheel carrier; and an outer constant velocity universal joint having an outer joint part defining an outer diameter and an inner joint part, said outer part being connected to said wheel hub, said outer diameter of said outer joint part being substantially similar in size to the outer diameter of said outer bearing ring and a diameter of said through bore such that said outer diameter of said outer joint part comprising a clearance fit relative to said through-bore and said outer diameter of said outer bearing ring comprising a press-fit relative to said through-bore.

* * * * *